United States Patent
Thannhuber

(10) Patent No.: US 12,124,306 B2
(45) Date of Patent: Oct. 22, 2024

(54) VISUAL OR ACOUSTIC PROJECT SUPPORT IN USING AN ELECTRIC APPLIANCE WITH A BATTERY PACK

(71) Applicant: Einhell Germany AG, Landau/Isar (DE)

(72) Inventor: Markus Thannhuber, Landau/Isar (DE)

(73) Assignee: EINHELL GERMANY AG, Landau/Isar (DE)

( * ) Notice: Subject to any disclaimer, the term of this patent is extended or adjusted under 35 U.S.C. 154(b) by 16 days.

(21) Appl. No.: 18/166,157

(22) Filed: Feb. 8, 2023

(65) Prior Publication Data

US 2023/0259187 A1   Aug. 17, 2023

(30) Foreign Application Priority Data

Feb. 11, 2022 (DE) ...................... 10 2022 103 305.8

(51) Int. Cl.
    *G06F 1/26* (2006.01)
(52) U.S. Cl.
    CPC ..................... *G06F 1/263* (2013.01)
(58) Field of Classification Search
    CPC . G06F 1/263; G06F 1/266; G06F 1/28; G06F 1/3215; G06F 1/3228; G06F 1/3234; H01M 10/4257
    See application file for complete search history.

(56) References Cited

U.S. PATENT DOCUMENTS

| | | | | |
|---|---|---|---|---|
| 10,408,884 B2 * | 9/2019 | Willey | ....................... | B25F 5/00 |
| 11,592,801 B2 * | 2/2023 | Krondorfer | ............... | B25F 5/00 |
| 11,599,093 B2 * | 3/2023 | Dey, IV | ................ | G06F 3/0482 |
| 11,963,079 B2 * | 4/2024 | Brault | ................. | H01M 50/204 |
| 2014/0107853 A1 * | 4/2014 | Ashinghurst | ............. | B25F 5/00 700/297 |
| 2019/0353712 A1 | 11/2019 | Willey | | |
| 2022/0084520 A1 * | 3/2022 | White | ....................... | B25F 5/00 |

FOREIGN PATENT DOCUMENTS

| | | |
|---|---|---|
| DE | 10 2019 211 238 A1 | 2/2021 |
| EP | 3 950 2360 A1 | 2/2022 |
| WO | 2020/236710 A1 | 11/2020 |

OTHER PUBLICATIONS

European Search Report issued Jun. 27, 2023 in EP Appl. No. 23 153 241.7.

* cited by examiner

*Primary Examiner* — Raymond N Phan
(74) *Attorney, Agent, or Firm* — MEDLER FERRO WOODHOUSE & MILLS PLLC

(57) ABSTRACT

A method is disclosed for project support in using an electric appliance with a battery pack. The method includes storing project data relating to at least a part of a sequence of project steps on a data storage of the battery pack, wherein the project data includes, for each project step, associated user information. For a predetermined project step of the sequence of project steps, the associated user information is output in visual and/or acoustic form by means of an output device of the battery pack. The user information and/or further user information for the predetermined project step are output in visual and/or acoustic form and/or provided for retrieval by a user by means of at least one external computing unit.

16 Claims, 1 Drawing Sheet

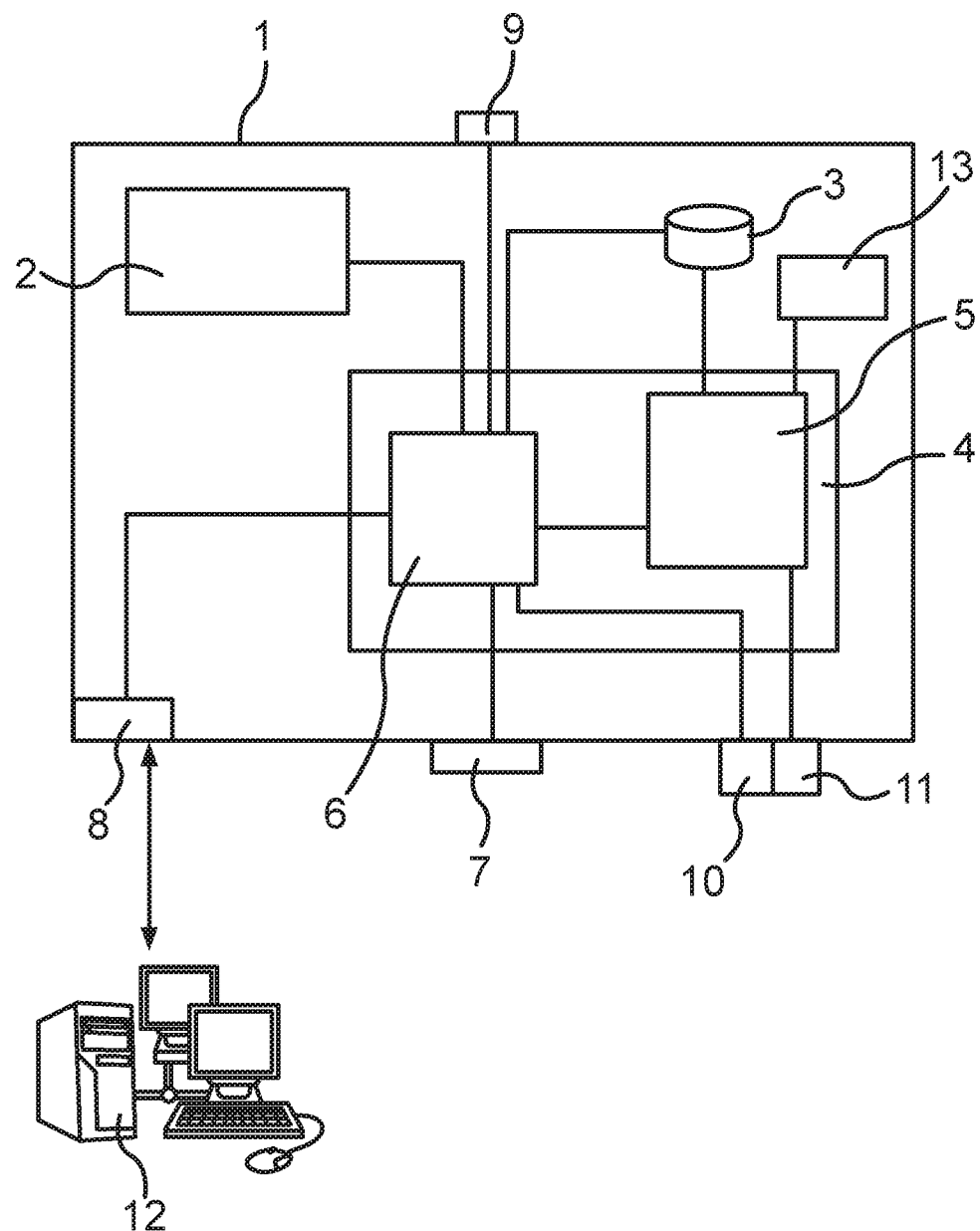

VISUAL OR ACOUSTIC PROJECT SUPPORT IN USING AN ELECTRIC APPLIANCE WITH A BATTERY PACK

FIELD

The present invention relates to a method and to a system for project support in using an electric appliance with a battery pack.

BACKGROUND

For performing projects using electric appliances, in particular electric tools, for example in the do-it-yourself sector, there can be the need of support in performing the project, for example to instruct a user to the effect which working steps or project steps should be performed in which order and/or in which manner.

SUMMARY

It is an object of the present invention to provide a project support as flexible and/or reliable as possible for the user of an electric appliance.

This object is solved by the respective subject matter of the independent claims. Advantageous developments and preferred embodiments are the subject matter of the dependent claims.

The invention is based on the idea of providing user information relating to a project step to a user on at least two information channels, wherein one information channel is realized by the battery pack of the electric appliance itself and at least one further information channel is realized via at least one computing unit external to the electric appliance and the battery pack.

According to an aspect of the invention, a method for project support in using an electric appliance with a battery pack is provided. Therein, project data relating to a sequence of project steps or a part of the sequence is stored on a data storage of the battery pack. For each project step of the sequence of project steps, the project data includes associated user information. For a predetermined project step of the sequence of project steps, the associated user information is output in visual and/or acoustic form by means of an output device of the battery pack, for example controlled by a control unit of the battery pack. The user information for the predetermined project step and/or further user information for the predetermined project step are output in visual and/or acoustic form and/or provided for retrieval by a user by means of at least one external computing unit, in particular at least one computing unit external to the electric appliance and in particular battery.

The battery pack can be mechanically and electrically connected to the electric appliance. For example, the battery pack can be, in particular non-destructively detachably, connected to a housing of the electric appliance, for example via a locking connection, a plug connection and/or a clamping connection. In particular, the mechanical connection of the battery pack to the housing of the electric appliance can be configured as a form-fit and/or force-fit connection without a materially bonded connection being present. In other words, the mechanical connection of the battery pack to the housing of the electric appliance can be detached without a materially bonded connection having to be detached. Preferably, the mechanical connection can as intended be manually detached without the employment of other tools. In other words, the battery pack is configured as an exchangeable battery pack, in particular system battery pack. For electrical and mechanical connection, the housings of the battery pack and of the electric appliance can comprise respective interfaces.

For the energy supply of the electric appliance, the battery pack comprises at least one battery cell, preferably multiple battery cells interconnected in series and/or in parallel. An electrical connection of the at least one battery cell to the electric appliance, for example to a motor of the electric appliance, can be effected via one or more detachable electrical contacts, for example clamping contacts or plug contacts, in particular so-called tulip contacts or blade contacts. For example, plugs or sockets or receptacles or the like each compatible with each other can be provided at the interfaces of the corresponding housings to achieve the electrical connection of the battery pack to the electric appliance.

The project steps of the sequence of project steps specify a project or a part of the project, wherein at least a part of the project steps can be performed using the electric appliance operable with the battery pack. In particular, it is not necessarily required that the electric appliance is used or can be used in all of the project steps. In various project steps, various electric appliances can also be employable, wherein the battery pack can optionally also be configured for the operation of multiple different electric appliances.

That the project steps are given in the form of the predefined sequence, can in particular be understood such that the sequence defines a defined order of the individual project steps. The order of the project steps is for example required or advantageous to be able to perform the desired project. Therein a project step can include one or more activities, which are to be performed by the user. The user information, which is stored in the data storage for a project step, describes one or more activities and/or a designation of the respective project step and/or an electric appliance to be employed and/or another accessory and/or material to be employed or the like. For example, the user information can include information relating to one or more requirements or recommendations for performing the respective project step, such as for instance information relating to a tool selection or tool configuration. Alternatively or additionally, the user information can also include information to sizes, measures, shape dimensions, position dimensions, material parameters and so on.

Thus, the project data in particular includes the user information for the individual project steps, but in particular also includes information relating to the corresponding order of the project steps within the sequence. Using this information, the control unit can in particular also process the corresponding user information in the corresponding order of the project steps, thus for example convert it into a corresponding audio signal by a voice synthesis circuit and output it by the speaker. Therein, the output of the individual voice outputs is preferably effected corresponding to a respective project status, which can be provided to the control unit by a user feedback or a temporal specification or other information.

The project data can be provided on an external data carrier and be loaded onto the data storage of the battery pack. Alternatively, the project data can for example also be loaded from an external electronic appliance, for example a server computer, a cloud computer system or another mobile electronic terminal, to the battery pack and in particular the data storage of the battery pack via a wireless communication device.

The output of the user information by the output device of the battery pack realizes a first information channel for the user. The output of the user information in visual form can for example include the display of one or more images, image sequences or videos on a display of the battery pack. The output of the user information in visual form can be supplemented by the output of the user information in acoustic form, thus in particular by a speaker of the battery pack. Alternatively, the user information can also be output only in acoustic form, in particular by means of the speaker.

The output of the user information and/or the further user information by means of the at least one external computing unit and/or the provision for retrieval by a user realize a second additional information channel for the user. Therein, the output by means of the at least one external computing unit can also include the corresponding control of at least one further output device. The at least one external computing unit can for example include a server computer system, also referred to as cloud computer system, and/or a mobile electronic terminal such as for instance a smartphone, a tablet computer, a notebook computer, and/or a stationary terminal such as for instance a PC, and so on. In order to provide the user information and/or the further user information for retrieval by a user, the at least one external computing unit can record the user information and/or the further user information or information derived therefrom in a user profile or user account of the user or provide them via a software application, also referred to as app, on the at least one external computing unit.

By the method according to the invention, an omnipresent user interface system with two or more information channels is provided to some extent. For performing the project, the user optionally uses the electric appliance and correspondingly the battery pack anyway such that the first information channel is immediately available if a corresponding instruction is required. However, by providing the second information channel, the user can also obtain information about the project or the next project step independently of the electric appliance and the battery pack, for example when he is currently not working on the project.

The predetermined project step can be predetermined in various manner. In various embodiments, the control unit can for example be configured to determine a current project status and to select the predetermined project step from the sequence or read it out of the data storage depending on the current project status.

Therein, the project status in particular corresponds to the information, which project steps of the sequence of project steps are already past or done and which ones are still pending and which one is the current or imminent project step, respectively. The control unit can determine this information for example based on a predetermined schedule, based on a user input or on measurements of operating parameters of the electric appliance or of the battery pack.

For example, the control unit can communicate the project status to the at least one external computing unit and/or a server computer or a cloud computer system. Thus, a synchronization of the project status can in particular be achieved.

Alternatively, the control unit can obtain the project status from the at least one external computing unit, in particular via a communication interface of the battery pack for wireless communication. In this manner, a synchronization of various information channels for the user can also be achieved. Thus, the current project status can be determined by the control unit of the battery pack on the one hand, the current project status can also be provided to other electronic appliances, for example mobile electronic terminals or desktop computers or the like, on the other hand, which can provide further other or differently conditioned information relating to the project and in particular to a current project step to the user on demand.

According to at least one embodiment of the method, at least a first part of the user information for the predetermined project step is output by an image or video output on a display of the battery pack.

Thus, a particularly high information density can be achieved, which is communicated to the user. In addition, specific visual representations of the pending working steps, positions on workpieces and so on can be presented.

According to at least one embodiment, at least a second part of the user information for the predetermined project step is output by a speaker of the battery pack.

In other words, the first information channel contains a voice channel for instructing the user. Thereby, a detailed instruction is possible without the user having to interrupt his current activity or without having to put the electric appliance down or having to leave it. Even if the battery pack is currently not in use, thus the user uses another electric appliance or no electric appliance, the battery pack is usually in the immediate environment of the user such that he himself can then be instructed as described.

According to at least one embodiment, the project data includes the second part of the user information for the predetermined project step in the form of a user text. By means of a voice synthesis circuit of the battery pack, in particular of the control unit, an audio signal corresponding to the user text is generated. For outputting the second part of the user information, a voice output is generated by means of the speaker based on the audio signal.

The user text includes one or more words, preferably multiple words in a predetermined sequence. The user text is stored on the data storage in particular in the form of a text file or a binary file, which represents the user text.

This in particular has the advantage that only a relatively low amount of data has to be transferred from outside of the battery pack to the data storage of the battery pack due to the provision of the project data or the user texts in text form. In particular, it is not required to transfer digitalized audio spectra or other voice files, which could directly define the voice output, to the battery pack since it includes itself the voice synthesis circuit. This in turn has the advantage that radio networks, which are only designed for a relatively low data throughput, can be used for communication of the battery pack with a server computer. Thus, in particular mobile radio networks or low power wide area networks, LPWAN, and in particular NB IoT (narrow band Internet of Things) networks are possible. Thus, for example a WLAN module in the battery pack can advantageously be omitted in corresponding embodiments.

A further advantage is in that the battery pack is equipped with the at least one battery cell according to definition and accordingly energy for the operation of the voice synthesis circuit and for communication with the at least one external computing unit, respectively, is always available. Even if the battery pack or the battery cells are not sufficiently charged anymore to drive a motor of the electric appliance or the like, namely, sufficient energy for the operation of the voice synthesis circuit and/or for communication is usually still available since the amount of energy required hereto is many times smaller, and battery cells, in particular lithium ion battery cells, are usually not completely discharged.

For generating the audio signal corresponding to the user text, the control unit or the voice synthesis circuit selects the user text associated with the predetermined project step or reads it out of the data storage. Based on the user text, which is in particular present as a text file or binary file as described, the voice synthesis circuit generates the audio signal using a method for voice synthesis known per se. In other words, the user text is converted into the audio signal by voice synthesis.

In alternative embodiments, the second part of the user information can also be present as an audio file. Then, the control unit can directly read out the audio file to generate the audio signal. Thus, the complexity of the control unit can be limited.

In further implementations, the voice synthesis circuit can be present externally to the battery pack, for example on the server computer. It can then transfer the converted user text, for example as an audio file, as the second part of the user information to the battery pack.

According to at least one embodiment, the user information and/or the further user information for the predetermined project step are output in visual and/or acoustic form by means of at least one further output device.

The at least one further output device can for example be completely or partially contained by the at least one external computing unit, for example a mobile electronic appliance or a stationary computer system.

According to at least one embodiment, the user information and/or the further user information for the predetermined project step are output by means of the output device and the at least one further output device, in particular each further output device of the at least one further output device, in synchronized manner.

This in particular means that the output device and all of the further output devices always output the user information and/or the further user information for the same project step. This synchronization can for example be coordinated and/or ensured by means of the at least one external computing unit.

According to at least one embodiment, the user information and/or the further user information for the predetermined project step are provided, in particular additionally or alternatively to the output by means of the further output device, in a user profile, which is stored on the at least one external computing unit, for retrieval by the user.

According to at least one embodiment, the project status is determined at least partially depending on a user input.

Therein, the user input can correspond to an input by the user into the battery pack. Alternatively, the user input can correspond to a user input at the electric appliance and the control unit can obtain the information about the user input from the electric appliance. Alternatively, the user input can also be effected at an external electronic appliance, for example an electronic mobile terminal, for instance a smartphone or tablet computer, and the control unit obtains the information about the user input via the communication link with the external electronic appliance.

In this manner, the user can thus provide the information to the control unit via the user input, that he currently needs a certain instruction or that the previous current project step is now concluded.

In particular, the battery pack can comprise an input device, which is configured for capturing a user interaction, and the control unit is configured to recognize the user input based on the captured user interaction.

For example, the user interaction can be understood as an action of the user on the input device. Therein, the input device can for example comprise a mechanical switch or button, a touch-sensitive input element and/or a microphone for capturing the user interaction.

In case of a switch or button, the user acts on the input device in that he presses or actuates the switch or button. In case of a touch-sensitive input element, for example a touch display or another area for touch recognition, the user acts on the input device in that he touches it. In case of a microphone, the user can act on the input device in that he outputs himself a voice command or a voice input to the microphone.

The use of a microphone for capturing the user interaction is particularly advantageous since the user then optionally does not have to depart from his current activity or posture to perform the user input. Thus, the user can for example formulate predefined voice commands such as for example "further" or "next step", to inform the control unit about the project status.

Further, by the action on the input device, the user can also cause the control unit to set the project status to a previous, thus in particular apparently already concluded, project step, to repeat a voice output and so on. Hereto, various input devices or various voice commands can be provided for different purposes.

Thus, a return into a previous project step is in particular also possible, for example initiated by a voice command "back" or the like of the user. Repetition of the respective project step is also conceivable.

In some embodiments, the control unit can also be configured to request the user to the user input by a voice request via the speaker, optionally using the voice synthesis circuit.

According to at least one embodiment, an initial project step of the sequence is determined as the predetermined project step, for example by means of the control unit. After generating the audio signal by the voice synthesis circuit, the user input is recognized, and after recognizing the user input, a project step of the sequence, following, in particular immediately following, the initial project step according to the sequence, is determined as the imminent project step of the sequence, for example by means of the control unit. By means of the voice synthesis circuit, for the imminent project step, a further audio signal corresponding to the associated user text is generated. In particular, a further voice output is generated based on the further audio signal by means of the speaker.

In other words, the project status is first given by the initial project step and the battery pack outputs the voice output corresponding to the user text recorded for the initial project step. Depending on the user input, the project status is then shifted by one project step to the imminent project step and the corresponding voice output is generated.

In analogous manner, the battery pack, in particular the control unit, the voice synthesis circuit and the speaker, can generate the voice output for one project step after the other according to the sequence respectively after a corresponding user input until it has been effected for all of the project steps of the sequence.

According to at least one embodiment, the battery pack comprises a communication interface for wireless communication with the at least one external computing unit.

In particular, the communication interface can be configured for wireless communication via a radio network, for example via a mobile radio network or an LPWAN. In particular, the radio network can be configured according to GSM, UMTS, LTE, 5G or NB IoT. Further, not cell-based approaches such as for instance LoRa or ZigBee are also possible.

According to at least one embodiment, the control unit obtains an input signal from the at least one external computing unit, in particular via the communication interface, and recognizes the user input based on the input signal.

Therefore, the user input can be performed at the at least one external computing unit, for example at a mobile electronic terminal such as for instance a smartphone, a laptop computer or a tablet computer. Hereto, a corresponding application can for example be implemented on the at least one external computing unit for capturing the user input or the input can be transferred to the control unit via a browser or a corresponding web server.

Thus, the user input can also be performed and the current project status can correspondingly also be determined depending on the user input if the battery pack is currently not within the reach of the user such that he could not actuate a mechanical key at the battery pack without change of location and cannot perform a voice input via the microphone without change of location, respectively.

According to at least one embodiment, the control unit obtains status information relating to the project status, in particular via the communication interface, from the at least one external computing unit and determines the project status at least partially depending on the status information.

Accordingly, the at least one external computing unit can generate itself the status information based on a user input or other information and provide it to the battery pack as described.

According to at least one embodiment, an output current and/or an output voltage of the at least one battery cell is controlled or regulated, in particular by means of the control unit, to provide electrical power for the operation of the electric appliance to the electric appliance. The output current and/or the output voltage are monitored, in particular by means of the control unit, and the project status is determined at least partially depending on a result of the monitoring.

The electrical power can be provided to the electric appliance in particular for operating a motor of the electric appliance.

By monitoring the output voltage and/or the output current and by a corresponding feedback in the temporal course of the output voltage and/or the output current from the electric appliance, which for example manifests itself in the form of so-called ripples, the control unit can obtain information about a course of the motor movement, for example a number of revolutions, a torque of the motor and so on. In this manner, the control unit can obtain information to the effect which activity and in which frequency or form, respectively, a certain activity has been performed by the electric appliance. Corresponding information for matching can be recorded in the project data.

In this manner, the control unit can at least partially estimate the project status without being dependent on a user input.

According to at least one embodiment, the control unit obtains the project data, in particular via the communication interface, from the at least one external computing unit, in particular via the mobile radio network or the LPWAN, and stores it on the data storage.

In other words, a project plan in the form of the project data for the sequence of project steps can be wirelessly provided to the battery pack in this manner via the cloud server, a web browser and a corresponding web server, a mobile electronic terminal or the like.

For example, various sequences of project steps can also be stored on the battery pack or the data storage, and according to which project is currently to be executed, the corresponding project data can be used. The selection of the project can for example also be effected by a user input, in particular a voice command.

According to a further aspect of the invention, a system for project support in using an electric appliance with a battery pack is provided. Therein, the system includes the battery pack and at least one external computing unit. The battery pack comprises a data storage, which stores project data relating to a predefined sequence of project steps or a part of the sequence, wherein the project data, for each project step of the sequence, includes associated user information. The battery pack comprises a control unit and an output device for outputting visual and/or acoustic contents, wherein the control unit is configured to control the output device to output, for a predetermined project step of the sequence of project steps, the associated user information in visual and/or acoustic form. The at least one external computing unit is configured to output the user information for the predetermined project step and/or further user information for the predetermined project step in visual and/or acoustic form, for example by means of a further output device, in particular of the at least one external computing unit, and/or to provide them for retrieval by a user.

Further embodiments of the system according to the invention directly follow from the various embodiments of the method and vice versa, respectively. In particular, a system according to the invention is configured to perform a method according to the invention or performs such a method.

BRIEF DESCRIPTION OF THE DRAWINGS

Further features of the invention are apparent from the claims, the figures and the description of figures. The features and feature combinations mentioned above in the description as well as the features and feature combinations mentioned below in the description of figures and/or shown in the figures can be encompassed by the invention not only in the respectively specified combination, but also in other combinations. In particular, implementations and feature combinations are also encompassed by the invention, which do not comprise all of the features of an originally formulated claim. Moreover, implementations and feature combinations are encompassed by the invention, which extend beyond or deviate from the feature combinations set forth in the relations of the claims.

In the following, the invention is explained in more detail with reference to schematic drawing.

FIG. 1 is a schematic block representation of an exemplary embodiment of a system according to the invention.

DETAILED DESCRIPTION

With reference to FIG. 1, the system contains a battery pack 1 for an electric appliance (not shown) and an external computing unit 12, for example a smartphone or a server computer. The battery pack 1 contains at least one battery cell 2 and a control unit 4 with a battery management circuit 6. The battery management circuit 6 is connected to the battery cells 2 and an electrical interface 7 of the battery pack 1. The battery pack 1 can be connected to the electric appliance via the electrical interface 7 to provide electrical energy stored in the battery cells 2 to it for the operation of the electric appliance. Therein, the battery management circuit 6 can regulate or control the current and/or voltage output.

In addition, the battery pack 1 comprises a data storage 3, which stores project data relating to a predefined sequence of project steps. In particular, the project data includes, for each of the project steps, associated user information. On a further data storage (not shown) of the external computing unit 12, the user information and/or further user information for each of the project steps are also stored.

In addition, the battery pack 1 comprises an output device, for example a display 13 and/or a speaker 11, which can be controlled by the control unit. The control unit can control the display 13 to output, for a predetermined project step, the associated user information in visual form, and/or control the speaker 11 to output, for the predetermined project step, the associated user information in acoustic form.

Furthermore, the external computing unit 12 can output the user information for the predetermined project step and/or the further user information for the predetermined project step in visual and/or acoustic form and/or provide them for retrieval by a user.

In various embodiments, at least a part of the user information is present as a user text, which is stored on the data storage 3, for example as a text file or binary file. The control unit 4, for example the battery management circuit 6, can obtain the text file or binary file from the external computing unit 12 or a further external computing unit (not shown) via a communication interface 8 of the battery pack 1 for wireless communication and store it on the data storage 3.

Furthermore, the battery pack 1, in particular the control unit 4, for example comprises a voice synthesis circuit 5, which is configured to read, for a predetermined project step of the sequence, the associated user text out of the data storage 3, and to generate a corresponding audio signal by means of a known voice synthesis methods based on the user text and to provide it to the speaker 11. The speaker 11 obtains the audio signal and can then generate a voice output to a user of the electric appliance based on the audio signal to support him in performing the project, in particular to provide information relating to the predetermined project step to the user.

In order to provide the information, which is the current project status, to the control unit 4, the user can for example interact with the battery pack 1 via a corresponding input device and thus give a feedback that he is ready for the next voice output corresponding to the next project step. For example, the input device can include a microphone 10 such that the user can perform the user input by a corresponding voice command. The control unit 4 can include a voice processor (not shown) to correspondingly process the voice command.

Alternatively or additionally, the input device can comprise a mechanical button 9, which the user can actuate to indicate that he is ready for the next voice output. Alternatively or additionally to the button 9, another mechanical switch or a touch-sensitive area or the like can also be provided.

An alternative possibility of determining the current project status is in that the user performs the user input via an external electronic appliance, for example a smartphone, and the external electronic appliance wirelessly provides a corresponding signal via the communication interface 8 to the control unit 4.

LIST OF REFERENCE CHARACTERS

1 Battery pack
2 battery cells
3 data storage
4 control unit
5 voice synthesis circuit
6 battery management circuit
7 electrical interface
8 communication interface
9 button
10 microphone
11 speaker
12 external computing unit
13 display

What is claimed is:

1. A method for project support in using an electric appliance with a battery pack, wherein
    project data relating to at least a part of a sequence of project steps is stored on a data storage of the battery pack, wherein the project data includes associated user information for each project step of the sequence of project steps;
    for a predetermined project step of the sequence of project steps, the associated user information is output in visual and/or acoustic form by means of an output device of the battery pack; and
    the user information for the predetermined project step and/or further user information for the predetermined project step are output by means of at least one external computing unit in visual and/or acoustic form and/or are provided for retrieval by a user,
    wherein at least a first part of the user information for the predetermined project step is output by an image output or video output on a display of the battery pack.

2. The method according to claim 1, wherein at least a second part of the user information for the predetermined project step is output by a speaker of the battery pack.

3. The method according to claim 1, wherein the user information and/or the further user information for the predetermined project step are output in visual and/or acoustic form by means of at least one further output device.

4. The method according to claim 1, wherein the user information and/or the further user information for the predetermined project step are provided in a user profile, which is stored on the at least one external computing unit, for retrieval by the user.

5. The method according to claim 1, wherein a current project status is determined and the predetermined project step is selected from the sequence depending on the current project status.

6. The method according to claim 2, wherein
    the project data includes the second part of the user information for the predetermined project step in the form of a user text;
    an audio signal corresponding to the user text is generated by means of a voice synthesis circuit of the battery pack; and
    for outputting the second part of the user information, a voice output is generated based on the audio signal by means of the speaker.

7. The method according to claim 3, wherein the user information and/or the further user information for the predetermined project step are output in synchronized manner by means of the output device and the at least one further output device.

8. The method according to claim 5, wherein the current project status is determined at least partially depending on a user input.

9. The method according to claim 5, wherein
an output current and/or an output voltage of at least one battery cell of the battery pack are controlled or regulated to provide electrical power to the electric appliance for the operation of the electric appliance; and
the output current and/or the output voltage are monitored, and the current project status is determined at least partially depending on a result of the monitoring.

10. A system for project support in using an electric appliance with a battery pack, the system comprising the battery pack and at least one external computing unit, wherein
the battery pack comprises a data storage, which stores project data relating to at least a part of a sequence of project steps, wherein the project data includes associated user information for each project step of the sequence;
the battery pack comprises a control unit and an output device for output of visual and/or acoustic contents, wherein the control unit is configured to control the output device to output, for a predetermined project step of the sequence of project steps, the associated user information in visual and/or acoustic form; and
the at least one external computing unit is configured to output the user information for the predetermined project step and/or further user information for the predetermined project step in visual and/or acoustic form and/or to provide them for retrieval by a user.

11. The system according to claim 10, wherein the output device comprises a display and the control unit is configured to output at least a first part of the user information for the predetermined project step by an image or video output on the display.

12. The system according to claim 10, wherein the control unit is configured to determine a current project status and to select the predetermined project step from the sequence depending on the current project status.

13. The system according to claim 11, wherein the output device comprises a speaker and the control unit is configured to output at least a second part of the user information for the predetermined project step by the speaker.

14. The system according to claim 12, wherein the control unit is configured to determine the current project status at least partially depending on a user input.

15. The system according to claim 13, wherein
the project data includes the second part of the user information for the predetermined project step in the form of a user text;
the control unit comprises a voice synthesis circuit, which is configured to generate an audio signal corresponding to the user text; and
the speaker is configured to generate a voice output based on the audio signal.

16. The system according to claim 14, wherein the battery pack comprises an input device, which is configured for capturing a user interaction, and the control unit is configured to recognize the user input based on the captured user interaction.

* * * * *